(12) United States Patent
Kitazawa et al.

(10) Patent No.: US 12,330,382 B2
(45) Date of Patent: Jun. 17, 2025

(54) SHAPING METHOD AND SHAPING DEVICE

(71) Applicant: MITSUBISHI HEAVY INDUSTRIES, LTD., Tokyo (JP)

(72) Inventors: Toshiki Kitazawa, Tokyo (JP); Masahiko Shimizu, Tokyo (JP); Tomoya Murata, Aichi (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 324 days.

(21) Appl. No.: 18/018,977

(22) PCT Filed: Mar. 11, 2021

(86) PCT No.: PCT/JP2021/009781
§ 371 (c)(1),
(2) Date: Jan. 31, 2023

(87) PCT Pub. No.: WO2022/190312
PCT Pub. Date: Sep. 15, 2022

(65) Prior Publication Data
US 2024/0034010 A1 Feb. 1, 2024

(51) Int. Cl.
*B29C 70/54* (2006.01)
*B29C 65/62* (2006.01)
(Continued)

(52) U.S. Cl.
CPC .......... *B29C 70/543* (2013.01); *B29C 70/34* (2013.01); *B29C 70/545* (2013.01); *B29C 65/62* (2013.01);
(Continued)

(58) Field of Classification Search
CPC .......... B32B 2038/008; B32B 38/1875; B32B 38/1825; B29C 70/34; B29C 70/342;
(Continued)

(56) References Cited

U.S. PATENT DOCUMENTS 6,814,916 B2   11/2004   Willden et al.
8,142,181 B2   3/2012   Willden et al.
(Continued)

FOREIGN PATENT DOCUMENTS

JP   2014152760 A   8/2014
JP   2016124125 A   7/2016
JP   2017193164 A   10/2017

OTHER PUBLICATIONS

International Search Report of International Application No. PCT/JP2021/009781 mailed Apr. 27, 2021; 5pp.

*Primary Examiner* — Carson Gross
(74) *Attorney, Agent, or Firm* — HAUPTMAN HAM, LLP

(57) ABSTRACT

A shaping method includes suturing, with a linear suture material, first end regions in a first predetermined direction of a plurality of sheet materials. The method includes fixing a second end region in the first predetermined direction of a laminated body to a first shaping method having a curved portion including at least one of a concave shape and a convex shape along a second predetermined direction in a state where the first predetermined direction coincides with the second predetermined direction. The method includes pressing a second shaping mold against the laminated body, which has been fixed to the first shaping mold in the fixing step, to shape the laminated body along the surface shape of the first shaping mold. The laminated body is shaped by applying a tension in the direction of pulling the first end region away from the second end region.

10 Claims, 16 Drawing Sheets

(51) Int. Cl.
  *B29C 70/34* (2006.01)
  *B29C 70/40* (2006.01)
  *B29C 70/56* (2006.01)
  *B32B 38/00* (2006.01)

(52) U.S. Cl.
  CPC .............. *B29C 70/40* (2013.01); *B29C 70/56* (2013.01); *B32B 2038/008* (2013.01); *B32B 38/1875* (2013.01)

(58) Field of Classification Search
  CPC ....... B29C 70/345; B29C 70/40; B29C 70/42; B29C 70/44; B29C 70/46; B29C 70/56; B29C 65/62
  USPC .......................................................... 156/93
  See application file for complete search history.

(56) References Cited

U.S. PATENT DOCUMENTS

| | | |
|---|---|---|
| 10,479,029 B2 | 11/2019 | Koncz |
| 2015/0314536 A1 | 11/2015 | Smith et al. |
| 2015/0328844 A1 | 11/2015 | Murakami et al. |
| 2017/0252982 A1 | 9/2017 | Knutson |
| 2018/0281269 A1 | 10/2018 | Sundquist et al. |

SHAPING METHOD AND SHAPING DEVICE

RELATED APPLICATIONS

The present application is a National Phase of International Application Number PCT/JP2021/009781 filed Mar. 11, 2021.

TECHNICAL FIELD

The present disclosure relates to a forming method of forming a laminate obtained by laminating a plurality of sheet materials including reinforcing fibers and to a forming device.

BACKGROUND ART

A composite structural member of an aircraft has a certain cross-sectional shape, and as a method of manufacturing the composite structural member, there is known a method of pressing a laminate that is obtained by laminating a plurality of sheet materials including reinforcing fibers against a forming die so as to form the laminate into a target shape (for example, refer to PTL 1). Disclosed in PTL 1 is forming a laminate such that plies are prevented from being wrinkled because of extraction of a sheet sandwiched between the plies when forming a laminate composed of a plurality of plies along the shape of an edge of a forming tool.

CITATION LIST

Patent Literature

[PTL 1] U.S. patent Ser. No. 10/479,029

SUMMARY OF INVENTION

Technical Problem

In PTL 1, a tension in the direction of extension of the plies is applied by means of a frictional force generated between the sheet and the plies at the time of extraction of the sheet. However, in a case where the frictional force generated between the sheet and the plies is not sufficient, a desired tension cannot be applied to the plies, so that the plies may be wrinkled.

The present disclosure has been made in view of such circumstances and an object thereof is to provide a forming method and a forming device with which it is possible to maintain a state where a desired tension is applied to a plurality of sheet materials and to form a laminate such that the laminate is prevented from being wrinkled when forming a laminate obtained by laminating a plurality of sheet materials including reinforcing fibers.

Solution to Problem

According to an aspect of the present disclosure, there is provided a forming method of forming a laminate that is obtained by laminating a plurality of sheet materials including reinforcing fibers, the forming method including: a suturing step of suturing, by means of a suture material that has a linear shape, a first end portion region in a first predetermined direction of the plurality of sheet materials in a state where the plurality of sheet materials are laminated; a fixing step of fixing a second end portion region in the first predetermined direction of the laminate to a first forming die in a state where the first predetermined direction coincides with a second predetermined direction, the first forming die including a curved portion having at least one of a concave shape and a convex shape along the second predetermined direction; and a forming step of forming the laminate along a surface shape of the first forming die by pressing a second forming die against the laminate fixed to the first forming die in the fixing step. In the forming step, the laminate is formed in a state where a tension in a direction in which the first end portion region is pulled away from the second end portion region along the first predetermined direction is applied to the plurality of sheet materials via a connecting member connected to the suture material.

According to an aspect of the present disclosure, there is provided a forming device forming a laminate that is obtained by laminating a plurality of sheet materials including reinforcing fiber, the laminate having a first end portion region in a first predetermined direction of the plurality of sheet materials of the laminate sutured by means of a suture material that has a linear shape in a state where the plurality of sheet materials are laminated. The forming device includes a first forming die that includes a curved portion having at least one of a concave shape and a convex shape along a second predetermined direction and to which a second end portion region in the first predetermined direction of the laminate is fixed in a state where the first predetermined direction coincides with the second predetermined direction, a second forming die that forms the laminate along a surface shape of the first forming die by pressing the laminate fixed to the first forming die against the first forming die, a connecting member that is connected to the suture material, and a tension generating mechanism that applies a tension in a direction in which the first end portion region is pulled away from the second end portion region along the first predetermined direction to the plurality of sheet materials via the connecting member.

Advantageous Effects of Invention

According to the aspects of the present disclosure, it is possible to provide a forming method and a forming device with which it is possible to maintain a state where a desired tension is applied to a plurality of sheet materials and to form a laminate such that the laminate is prevented from being wrinkled when forming a laminate obtained by laminating a plurality of sheet materials including reinforcing fibers.

DESCRIPTION OF EMBODIMENTS

Figure 1:
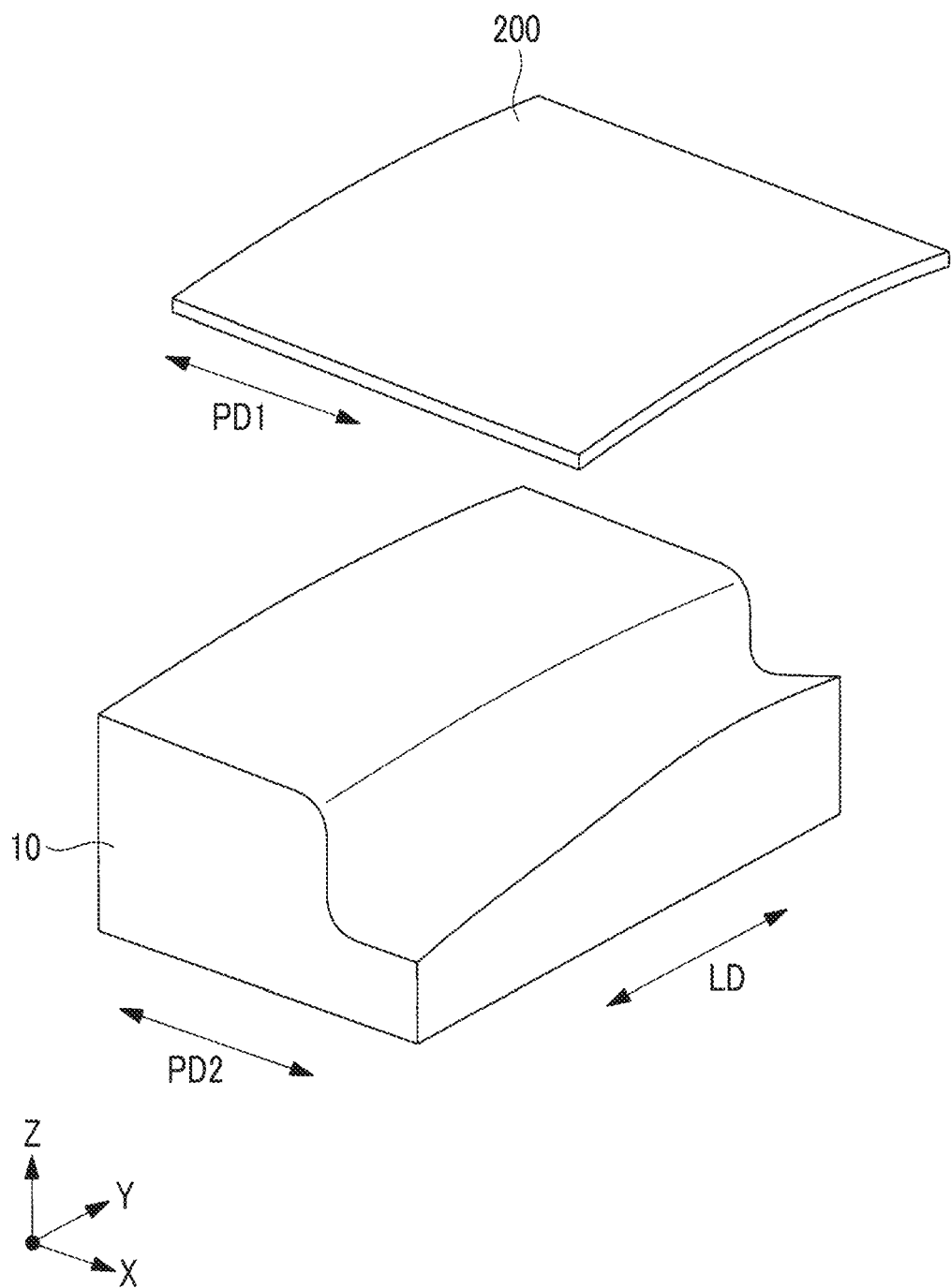
FIG. 1 is a perspective view showing a lower die and a laminate according to an embodiment of the present disclosure and shows a state before the forming of the laminate.
Figure 2:
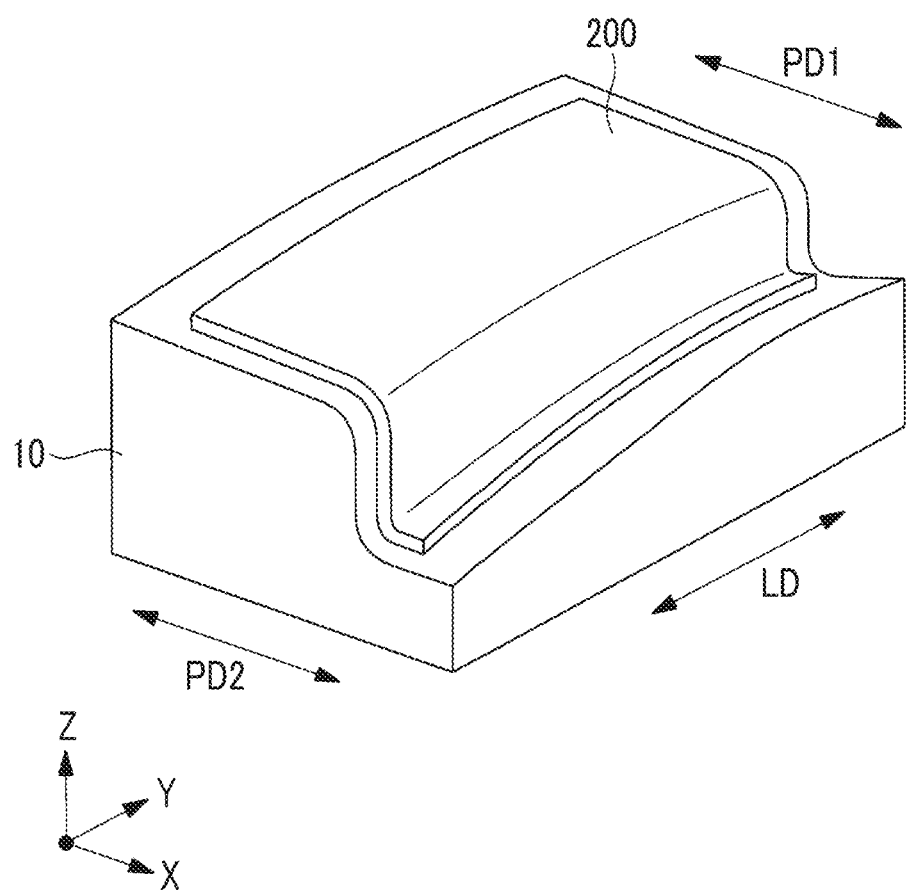
FIG. 2 is a perspective view showing the lower die and the laminate according to the embodiment of the present disclosure and shows a state after the forming of the laminate.

Hereinafter, a forming device 100 according to an embodiment of the present disclosure and a forming method in which the forming device 100 is used will be described with reference to the drawings. FIG. 1 is a perspective view showing a lower die 10 and a laminate 200 according to the present embodiment and shows a state before the forming of the laminate 200. FIG. 2 is a perspective view showing the lower die 10 and the laminate 200 according to the present embodiment and shows a state after the forming of the laminate 200.

The forming device 100 of the present embodiment is a device that forms the laminate 200, which is obtained by laminating a plurality of sheet materials, along the surface shapes of the lower die 10 (first forming die) and an upper die (second forming die) 20. As shown in FIG. 1, the laminate 200 before the forming thereof is obtained by laminating a plurality of sheet-shaped composite materials in a flat shape.

In the present embodiment, as the laminate 200, a laminate that is formed in a flat shape by laminating a plurality of reinforcing fiber sheets (dry sheets) including no matrix resin is used. In a case where the reinforcing fiber sheets including no matrix resin are used, a resin transfer molding (RTM) method, in which the laminate 200 formed along the surface shapes of the lower die 10 and the upper die 20 is disposed on a molding tool (not shown) and a resin material is injected into the molding tool and is caused to infiltrate reinforcing fibers so that molding is performed, is used. The reinforcing fibers included in the reinforcing fiber sheets are, for example, carbon fibers, glass fibers, aramid fibers, or the like.

As described above, in the present embodiment, a plurality of sheet-shaped reinforcing fiber sheets including no matrix resin are used as the laminate 200. However, other configurations may also be adopted. For example, as the laminate 200, a laminate that is obtained by laminating a plurality of reinforcing fiber sheets including matrix resins may also be used.

As the matrix resins included in the reinforcing fiber sheets, thermosetting resins or thermoplastic resins can be used. Examples of the thermosetting matrix resins include an epoxy resin, unsaturated polyester, vinyl ester, phenol, cyanate ester, and polyimide.

Examples of the thermoplastic matrix resins include polyetheretherketone (PEEK), polyethylene terephthalate (PET), polybutylene terephthalate (PBT), nylon 6 (PA6), nylon 66 (PA66), polyphenylene sulfide (PPS), polyetherimide (PEI), and polyetherketoneketone (PEKK).

In a case where thermoplastic resins are used as the matrix resins, the forming device 100 includes a heating mechanism (not shown) that can heat the thermoplastic resins included in the laminate 200 to a temperature equal to or higher than the softening point thereof. It is possible to form the laminate 200 including the thermoplastic resins along the surface shapes of the lower die 10 and the upper die 20 by heating the thermoplastic resins to a temperature equal to or higher than the softening point by means of the heating mechanism.

Note that, in a case where a plurality of sheet-shaped reinforcing fiber sheets including no matrix resin are used or in a case where thermosetting resins are used as matrix resins, the reinforcing fiber sheets may be heated by the heating mechanism (not shown) as necessary so that the laminate 200 is formed along the surface shapes of the lower die 10 and the upper die 20.

Figure 3:
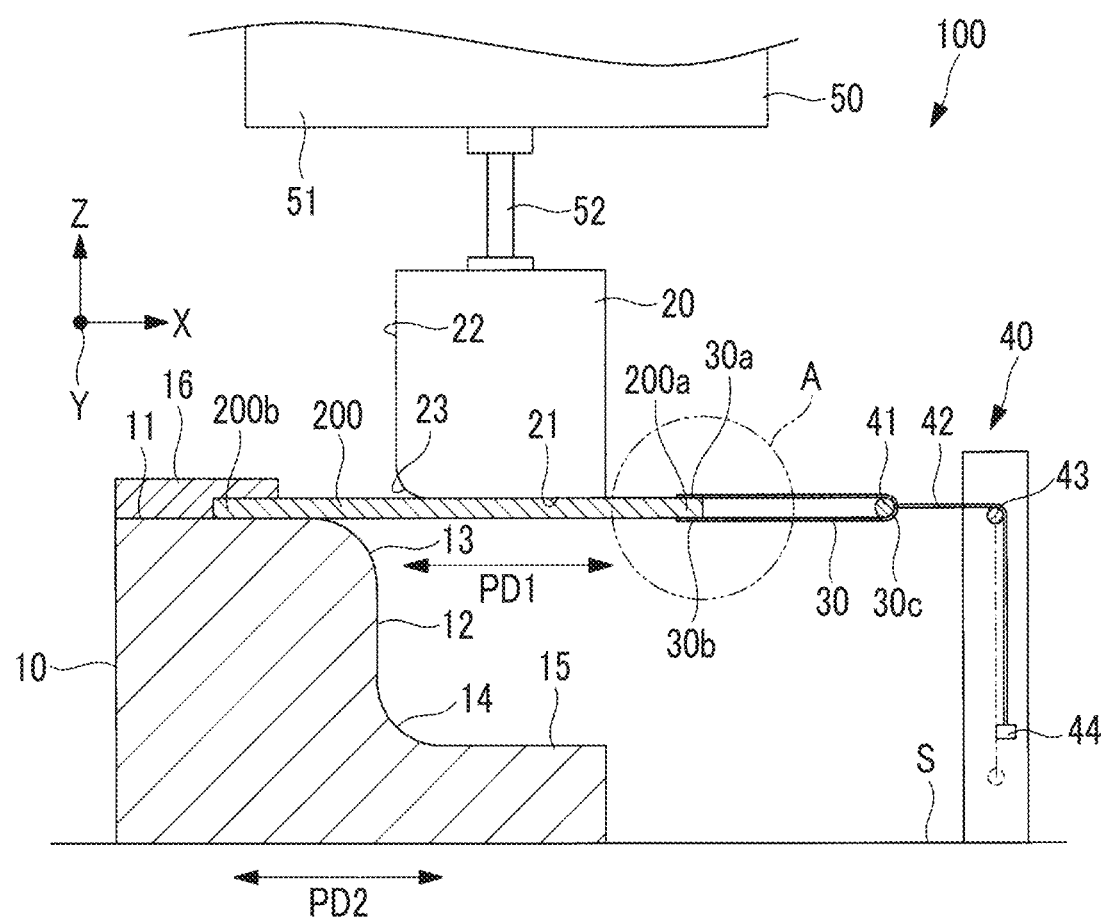
FIG. 3 is a cross-sectional view that shows a forming device according to the embodiment of the present disclosure and that shows a state before the forming of the laminate.
Figure 4:
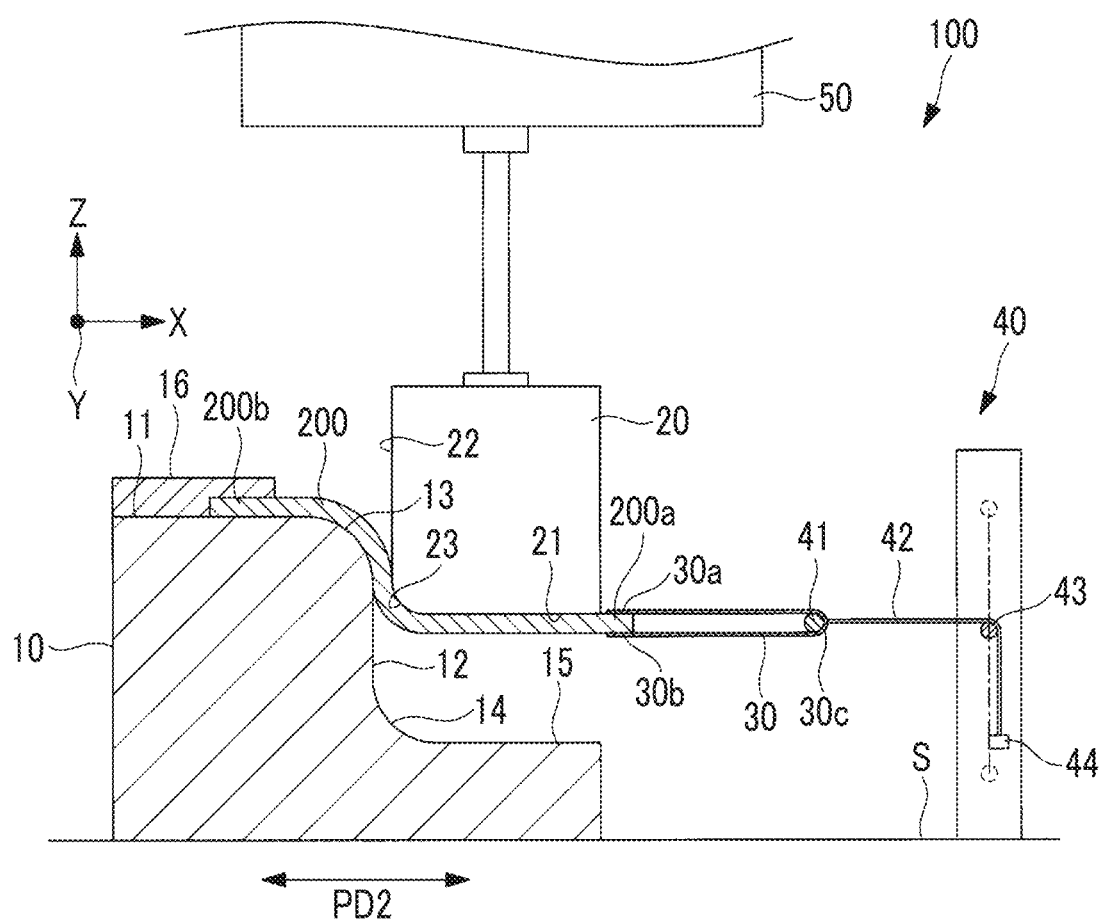
FIG. 4 is a cross-sectional view that shows the forming device according to the embodiment of the present disclosure and that shows a state during the forming of the laminate.

The details of the forming device 100 according to the present embodiment will be described with reference to the drawings. FIG. 3 is a cross-sectional view that shows the forming device 100 according to the present embodiment and that shows a state before the forming of the laminate 200. FIG. 4 is a cross-sectional view that shows the forming device 100 according to the present embodiment and that shows a state during the forming of the laminate 200. FIG. is a cross-sectional view that shows the forming device 100 according to the present embodiment and that shows a state where the forming of the laminate 200 is finished.

Figure 5:
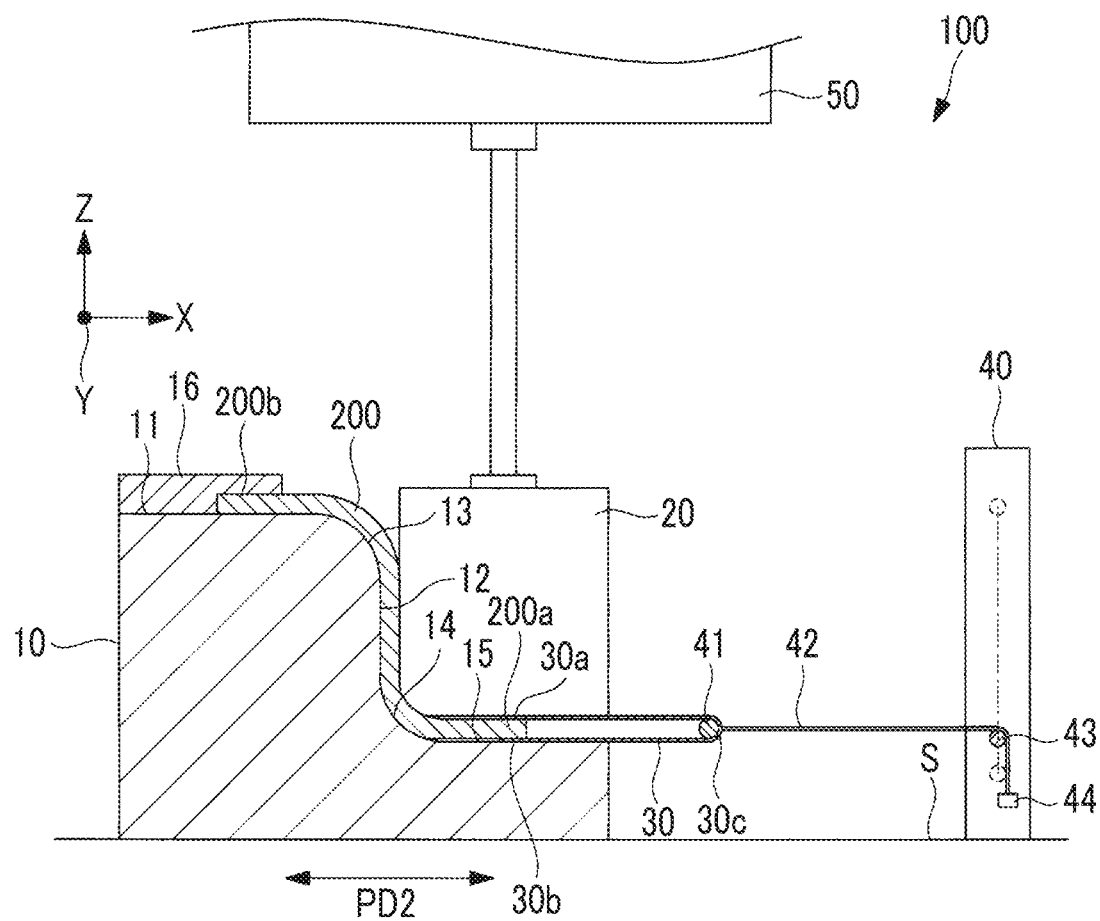
FIG. 5 is a cross-sectional view that shows the forming device according to the embodiment of the present disclosure and that shows a state where the forming of the laminate is finished.

As shown in FIGS. 3 to 5, the forming device 100 of the present embodiment includes the lower die 10, the upper die 20, a connection sheet (connecting member) 30 connected to the laminate 200, a tension generating mechanism 40, and an urging force generating mechanism 50.

The forming device 100 shown in FIGS. 3 to 5 is disposed in a three-dimensional space. An X-axis, a Y-axis, and a Z-axis shown in FIGS. 3 to 5 are axes that intersect each other in the three-dimensional space. The X-axis is an axis extending along an installation surface S on which the lower die 10 is installed, and the Z-axis is an axis extending in a direction orthogonal to the installation surface S on which the lower die 10 is installed. The Y-axis is an axis orthogonal to both of the X-axis and the Z-axis and is an axis extending along a paper surface depth direction of FIGS. 3 to 5.

The lower die 10 is a block-shaped die having a surface shape for forming the laminate 200 and is formed of a metallic material, for example. As the surface shape for forming the laminate 200, the lower die 10 includes an upper surface 11, a side surface 12, a convex surface (curved portion) 13, a concave surface 14 (curved portion), and a bottom surface 15. FIGS. 3 to 5 show a cross section of the lower die 10 at the central portion in a longitudinal direction LD along an axis Y.

As shown in FIGS. 3 to 5, the upper surface 11 of the lower die 10 is a surface extending flat along the X-axis. The side surface 12 of the lower die 10 is a surface extending flat along the Z-axis. The bottom surface 15 of the lower die 10 is a surface extending flat along the X-axis.

The convex surface 13 is a surface that connects the upper surface 11 and the side surface 12 to each other and that has an arc-like shape in which the normal direction of the surface gradually changes toward the side surface 12 from the upper surface 11 along the X-axis with a transition from a surface extending along the X-axis to a surface extending along the Z-axis. The convex surface 13 is a portion having a convex shape along a second predetermined direction PD2 parallel to the X-axis.

The concave surface 14 is a surface that connects the side surface 12 and the bottom surface 15 to each other and that has an arc-like shape in which the normal direction of the surface gradually changes toward the bottom surface 15 from the side surface 12 along the Z-axis with a transition from a surface extending along the Z-axis to a surface extending along the X-axis. The concave surface 14 is a portion having a concave shape along a second predetermined direction PD2 parallel to the X-axis.

As shown in FIGS. 3 to 5, the laminate 200 includes a first end portion region 200a and a second end portion region 200b along a first predetermined direction PD1 parallel to an axis X. The second end portion region 200b of the laminate 200 is fixed to the lower die 10 in a state where the first predetermined direction PD1 of the laminate 200 and the second predetermined direction PD2 of the lower die 10 coincide with each other. The second end portion region 200b of the laminate 200 is fixed to a predetermined position on the upper surface 11 of the lower die 10 by means of a fixation member 16.

The shape of the lower die 10 shown in FIGS. 3 to 5 may be different. For example, the upper surface 11 and the bottom surface 15 may be surfaces extending in a direction different from the X-axis and may be surfaces that are not flat. In addition, the side surface 12 may be a surface extending in a direction different from the Z-axis and may be a surface that is not flat. In addition, the convex surface 13 may have any convex shape different from an arc-like shape. In addition, the concave surface 14 may have any concave shape different from an arc-like shape. The lower die 10 only has to have a shape including at least one of a concave shape and a convex shape along the first predetermined direction PD1.

The upper die 20 is a block-shaped die that presses the laminate 200, of which the second end portion region 200b is fixed to the lower die 10, against the lower die 10 to form the laminate 200 along the surface shape of the lower die 10 and is formed of a metallic material, for example. The upper die 20 presses the laminate 200 fixed to the lower die 10 against the lower die 10 to form the laminate 200 along the surface shapes of the lower die 10 and the upper die 20. As the surface shape for forming the laminate 200, the upper die 20 includes a lower surface 21, a side surface 22, and a convex surface 23.

As shown in FIGS. 3 to 5, the lower surface 21 of the upper die 20 is a surface extending flat along the X-axis. The side surface 22 of the upper die 20 is a surface extending flat along the Z-axis. The convex surface 23 is a surface that connects the lower surface 21 and the side surface 22 to each other and that has an arc-like shape in which the normal direction of the surface gradually changes toward the side surface 22 from the lower surface 21 along the X-axis with a transition from a surface extending along the X-axis to a surface extending along the Z-axis. The convex surface 23 has a shape corresponding to the concave surface 14 of the lower die 10.

The connection sheet 30 is a sheet that is connected to a suture material 300 for suturing the plurality of reinforcing fiber sheets of the laminate 200. The connection sheet 30 is, for example, a film formed of non-woven fabric, a resin material (for example, thermoplastic resin material), or the like. The suture material 300 is a member formed in a linear shape, and is formed of, for example, a resin material such as nylon, a metallic material such as stainless steel, glass fibers, carbon fibers, or the like.

In a case where the same material as those included in the reinforcing fiber sheets constituting the laminate 200 is used as the suture material 300, a cutting step (step of cutting first end portion region 200a of laminate 200) which will be described later may be omitted. Alternatively, a region to be cut in the cutting step may be only a portion of the first end portion region 200a. This is because, in a case where the same material as those included in the reinforcing fiber sheets constituting the laminate 200 is used, there is little problem in quality even if the suture material 300 is included in the final product.

The connection sheet 30 shown in FIGS. 3 to 5 is disposed in a state where a first end portion 30a is in contact with an upper surface of the first end portion region 200a of the laminate 200 and a second end portion 30b is in contact with a lower surface of the first end portion region 200a. A rod-shaped member 41 of the tension generating mechanism 40 is inserted into the connection sheet 30 such that the rod-shaped member 41 comes into contact with an intermediate portion 30c between the first end portion 30a and the second end portion 30b.

The tension generating mechanism 40 is a mechanism that applies, via the connection sheet 30, a tension to the plurality of reinforcing fiber sheets of the laminate 200 in a direction in which the first end portion region 200a of the laminate 200 is pulled away from the second end portion region 200b along the first predetermined direction PD1. The tension generating mechanism 40 includes the rod-shaped member 41, a wire 42, a supporting shaft 43, and a weight 44.

The rod-shaped member 41 is a member that extends in a rod-like shape along the axis Y and is connected to the wire 42 at both end portions thereof. One end of the wire 42 is connected to the rod-shaped member 41 and the other end of the wire 42 is connected to the weight 44. The wire 42 is supported by the supporting shaft 43. A tension in a downward direction along an axis Z that is caused by the weight of the weight 44 is changed, by the supporting shaft 43, to a tension in a direction in which the rod-shaped member 41 approaches the supporting shaft 43 along the axis X.

The supporting shaft 43 moves along the axis Z in accordance with the position of the lower surface 21 of the upper die 20. The position of the supporting shaft 43 is changed in a direction along the axis Z such that a tension in the direction in which the rod-shaped member 41 approaches the supporting shaft 43 along the axis X is generated.

The tension generating mechanism 40 shown in FIG. 3 applies a tension to the laminate 200 by means of the weight of the weight 44. However, other configurations may also be adopted. For example, the tension may be applied to the laminate 200 via an elastically deformable member such as a spring. In addition, the tension may be applied to the laminate 200 by an actuator that is operated by means of a hydraulic pressure or the like.

The urging force generating mechanism 50 is a mechanism that generates an urging force that urges the upper die 20 toward the lower die 10. The urging force generating mechanism 50 includes a main body portion 51 of which the position is fixed and an expansion and contraction member 52 that can be expanded and contracted in a direction along the axis Z with respect to the main body portion 51 and that is attached to the upper die 20. The urging force generating mechanism 50 generates an urging force that presses the laminate 200 toward the lower die 10 by, for example, expanding the expansion and contraction member 52 by means of a hydraulic pressure.

Figure 6:
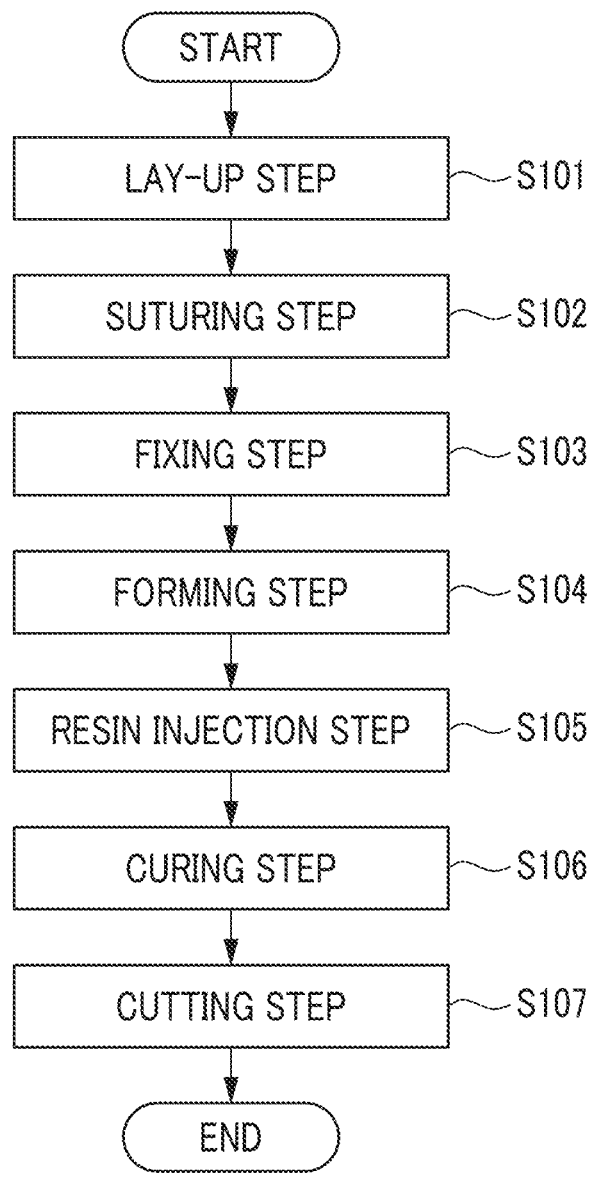
FIG. 6 is a flowchart showing a composite material molding method according to the embodiment of the present disclosure.

Next, a composite material molding method of forming the laminate 200 by means of the forming device 100 of the present embodiment and molding a composite material will be described with reference to FIG. 6. FIG. 6 is a flowchart showing the forming method according to the present embodiment.

In a lay-up step of step S101, a plurality of reinforcing fiber sheets are laminated in a one-by-one manner on an installation jig (not shown) including a flat installation surface so that the laminate 200 in a flat shape that is composed of the plurality of reinforcing fiber sheets is obtained.

Figure 7:
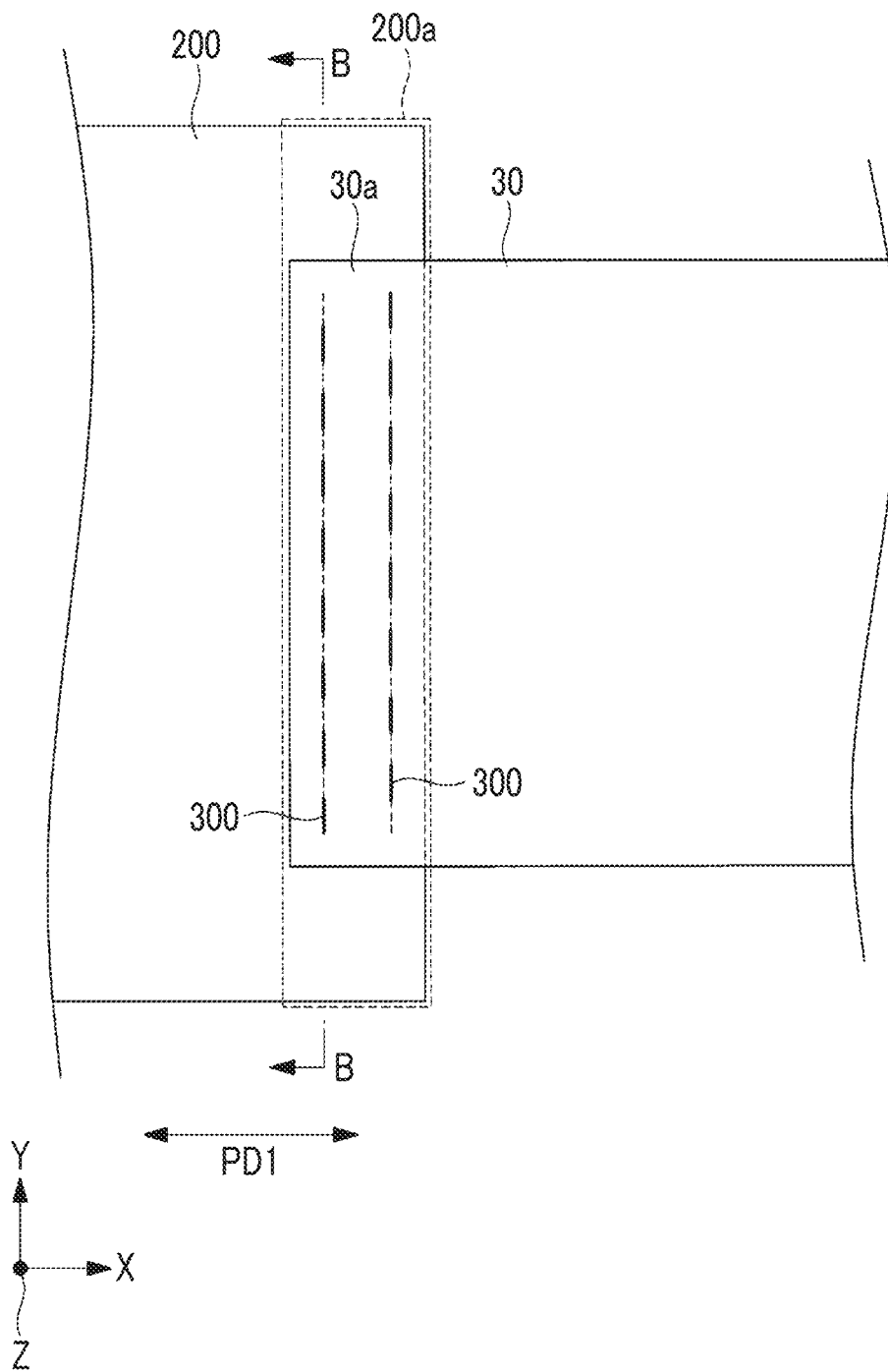
FIG. 7 is a plan view showing a part A in FIG. 3 as seen from above.
Figure 8:
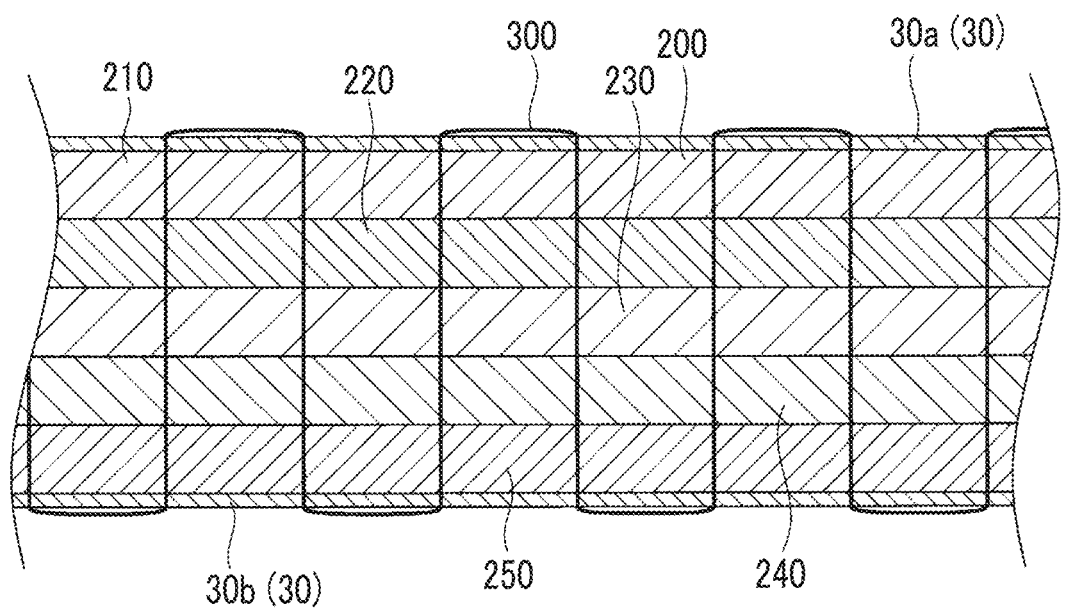
FIG. 8 is a cross-sectional view taken along line B-B which shows the laminate shown in FIG. 7 as seen along arrows.
Figure 8:
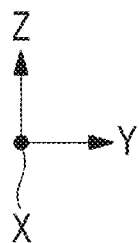

In a suturing step of step S102, the first end portion region 200*a* of the laminate 200 and the connection sheet 30 are sutured together by means of the linear suture material 300. FIG. 7 is a plan view showing a part A in FIG. 3 as seen from above. FIG. 8 is a cross-sectional view taken along line B-B which shows the laminate 200 shown in FIG. 7 as seen along arrows. As shown in FIGS. 7 and 8, regarding the laminate 200, the first end portion region 200*a* in the first predetermined direction PD1 of the plurality of reinforcing fiber sheets is sutured together by means of the linear suture material 300 in a state where the plurality of reinforcing fiber sheets are laminated.

As shown in FIG. 7, the first end portion region 200*a* of the laminate 200 and the connection sheet 30 are sutured together by means of the suture material 300 in a direction along the axis Y. Solid lines shown in FIG. 7 represent portions of the suture material 300 that are exposed at the upper surface of the laminate 200, and broken lines shown in FIG. 7 represent portions of the suture material 300 that are exposed at a back surface of the laminate 200.

As shown in FIG. 8, the laminate 200 is obtained by laminating a reinforcing fiber sheet (sheet material) 210, a reinforcing fiber sheet 220, a reinforcing fiber sheet 230, a reinforcing fiber sheet 240, and a reinforcing fiber sheet 250. The first end portion 30*a* of the connection sheet 30 is disposed to come into contact with an upper surface of the reinforcing fiber sheet 210 and the second end portion 30*b* of the connection sheet 30 is disposed to come into contact with a lower surface of the reinforcing fiber sheet 250. The laminate 200 shown in FIG. 8 is obtained by laminating the five reinforcing fiber sheets. However, the laminate 200 obtained by laminating any other number of reinforcing fiber sheets may also be used.

In FIGS. 7 and 8, the first end portion region 200*a* of the laminate 200 and the connection sheet 30 are sutured together through running stitch. However, the first end portion region 200*a* of the laminate 200 and the connection sheet 30 may be sutured together through back stitch or half-back stitch. In addition, in FIG. 7, the first end portion region 200*a* of the laminate 200 and the connection sheet 30 are sutured together along the axis Y at two positions of which the positions are different from each other in a direction along the axis X. However, the first end portion region 200*a* of the laminate 200 and the connection sheet 30 may be sutured together at one position or three or more positions.

In a fixing step of step S103, the second end portion region 200*b* of the laminate 200 is fixed to the upper surface 11 of the lower die 10 in a state where the first predetermined direction PD1 of the laminate 200 coincides with the second predetermined direction PD2 of the lower die 10. The laminate 200 is fixed to the lower die 10 by attaching the fixation member 16 to the upper surface 11 and causing the second end portion region 200*b* to be sandwiched between the fixation member 16 and the upper surface 11.

In a forming step of step S104, the urging force generating mechanism 50 presses the upper die 20 against the laminate 200 in a downward direction along the axis Z so that the laminate 200 is formed along the surface shape of the lower die 10. In a case where the upper die 20 disposed above the upper surface of the laminate 200 is moved downward, the lower surface 21 of the upper die 20 comes into contact with the upper surface of the laminate 200, so that a state shown in FIG. 3 is achieved.

As shown in FIG. 3, a tension in a direction in which the first end portion region 200*a* is pulled away from the second end portion region 200*b* along the first predetermined direction PD1 is applied to the plurality of reinforcing fiber sheets of the laminate 200 via the connection sheet connected to the suture material 300. Therefore, the laminate 200 is prevented from being wrinkled in a case where the upper die 20 comes into contact with the upper surface of the laminate 200 and is moved downward.

In a case where the upper die 20 is further moved downward in the state as shown in FIG. 3, the lower surface of the laminate 200 is formed along the shape of the convex surface 13 and the shape of the side surface 12 of the lower die 10, so that a state shown in FIG. 4 is achieved. As shown in FIG. 4, the supporting shaft 43 of the tension generating mechanism 40 is moved to a position below a position shown in FIG. 3 so that the position thereof relative to the lower surface 21 of the upper die 20 in the direction along the axis Z is maintained.

In a case where the upper die 20 is further moved downward in the state as shown in FIG. 4, the lower surface of the laminate 200 is formed along the shape of the concave surface 14 and the shape of the bottom surface 15 of the lower die 10, so that a state shown in FIG. 5 is achieved. As shown in FIG. 5, the supporting shaft 43 of the tension generating mechanism 40 is moved to a position below the position shown in FIG. 4 so that the position thereof relative to the lower surface 21 of the upper die 20 in the direction along the axis Z is maintained.

As described above, in a case where the upper die 20 is moved from an upper side to a lower side so that the laminate 200 is formed, a tension in the direction in which the first end portion region 200*a* is pulled away from the second end portion region 200*b* along the first predetermined direction PD1 is applied to the plurality of reinforcing fiber sheets of the laminate 200 via the connection sheet 30 connected to the suture material 300. Accordingly, the laminate 200 is prevented from being wrinkled in a case where the upper die 20 comes into contact with the upper surface of the laminate 200 and is moved downward.

After the laminate 200 is formed along the surface shapes of the lower die 10 and the upper die 20 as shown in FIG. 5, the upper die 20 is moved upward. In addition, the suture material 300 is removed from the first end portion region 200a of the laminate 200, and the connection sheet is detached from the first end portion region 200a. Note that a portion of the suture material 300 may not be removed from the first end portion region 200a of the laminate 200.

In a resin injection step of step S105, the laminate 200 formed along the surface shapes of the lower die 10 and the upper die 20 is disposed on a molding tool (not shown). Thereafter, a resin material is injected into the molding tool and the resin material is caused to infiltrate the plurality of reinforcing fiber sheets of the laminate 200.

In a curing step of step S106, the resin material caused to infiltrate into the plurality of reinforcing fiber sheets of the laminate 200 is cured. In a case where the resin material is thermosetting, the resin material is heated to a temperature equal to or higher than the curing temperature thereof so that the resin material is cured. In a case where the resin material is a thermoplastic resin, the resin material is cooled to a temperature lower than the softening point thereof so that the resin material is cured.

In the cutting step of step S107, the first end portion region 200a of the laminate 200 in which the resin material has been cured is cut by means of a cutting mechanism (not shown). It is possible to remove an unnecessary portion from a final product by cutting the first end portion region 200a of the laminate 200 by means of the cutting mechanism. Through step S101 to step S107, the composite material molding method of molding a composite material by forming the laminate 200 by means of the forming device 100 is performed.

First Modification Example

Regarding the laminate 200 shown in FIGS. 7 and 8, the first end portion region 200a is sutured in the direction along the axis Y by means of the suture material 300. However, other configurations may also be adopted. For example, as shown in FIG. 9, the first end portion region 200a of the laminate 200 may be sutured in a direction along the axis X by means of the suture material 300.

Figure 9:
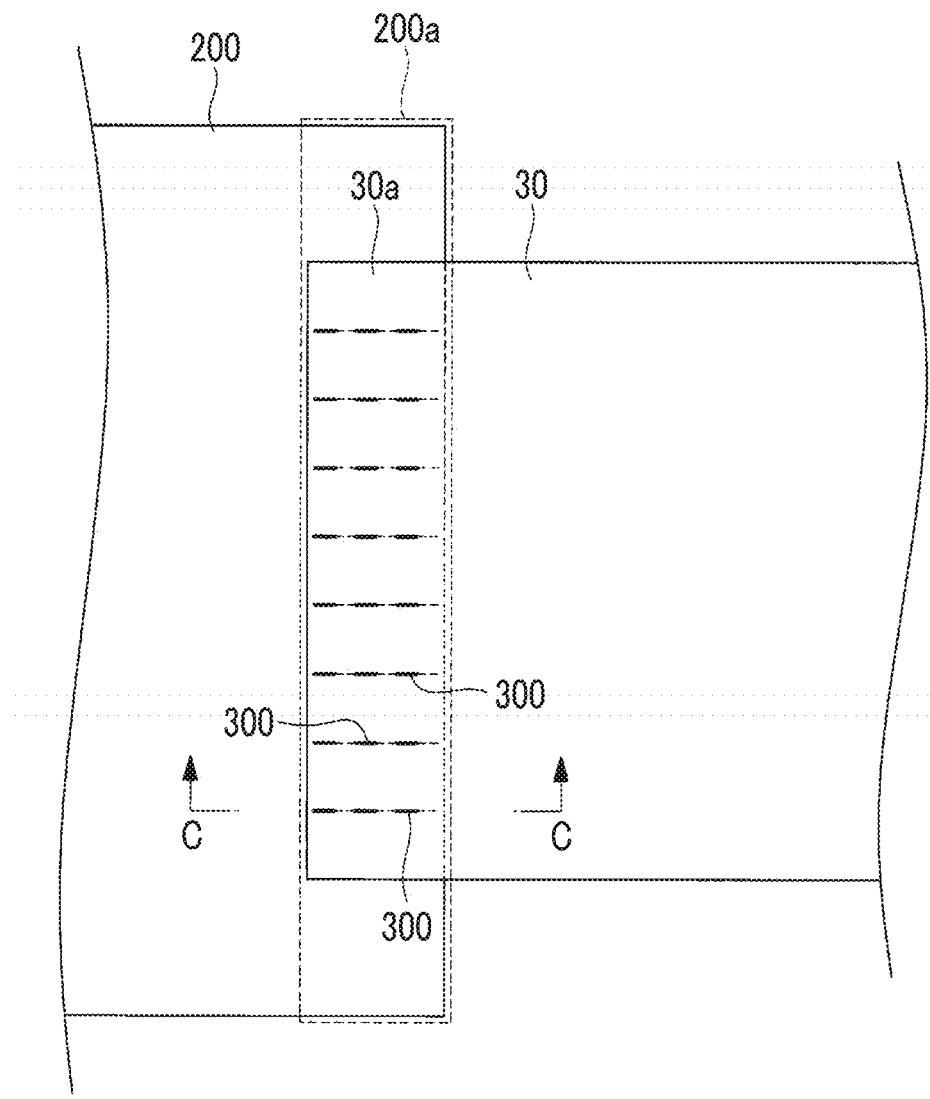
FIG. 9 is a plan view showing a first modification example of the laminate of the present disclosure.

FIG. 9 is a plan view showing a first modification example of the laminate 200 of the present disclosure. As shown in FIG. 9, the first end portion region 200a of the laminate 200 and the connection sheet 30 are sutured together by means of the suture material 300 in the direction along the axis X. Solid lines shown in FIG. 9 represent portions of the suture material 300 that are exposed at the upper surface of the laminate 200, and broken lines shown in FIG. 9 represent portions of the suture material 300 that are exposed at a back surface of the laminate 200.

Figure 10:
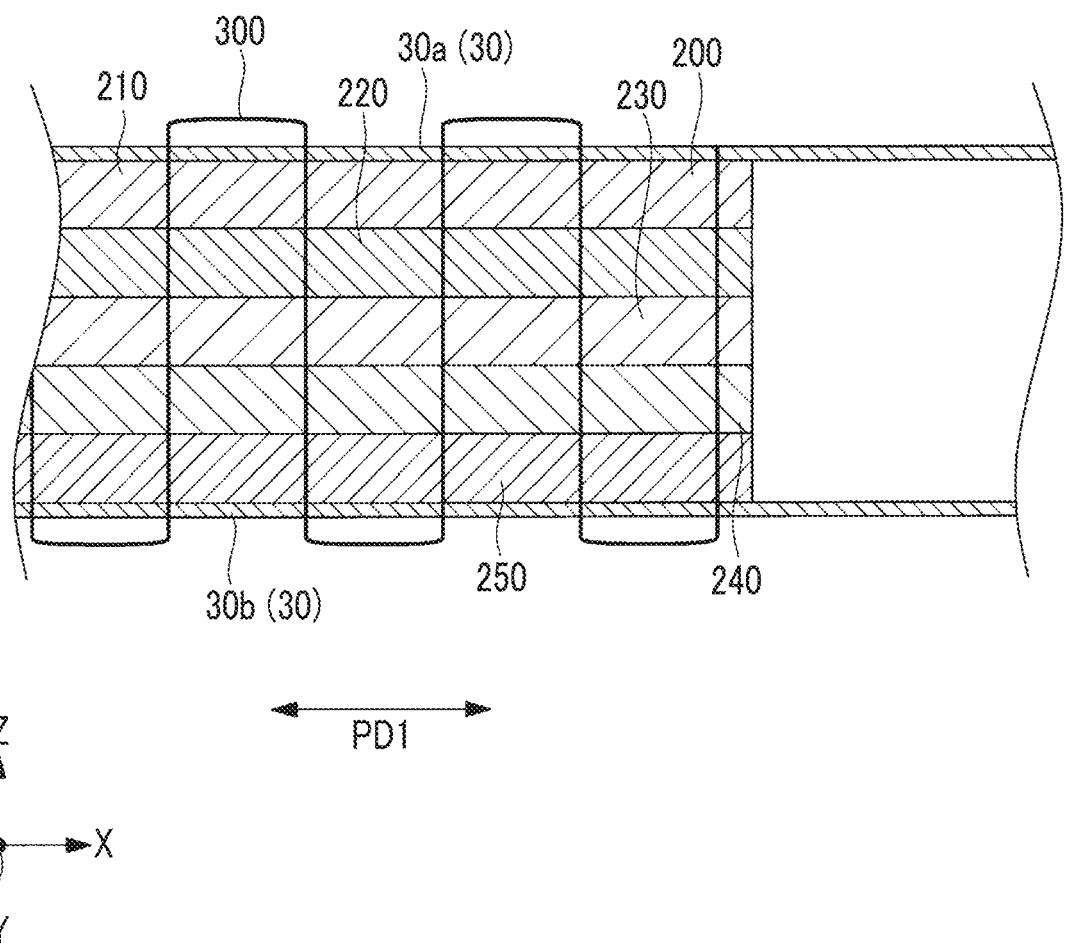
FIG. 10 is a cross-sectional view taken along line C-C which shows the laminate shown in FIG. 9 as seen along arrows and shows a state where there is no interlayer slip in the laminate.
Figure 11:
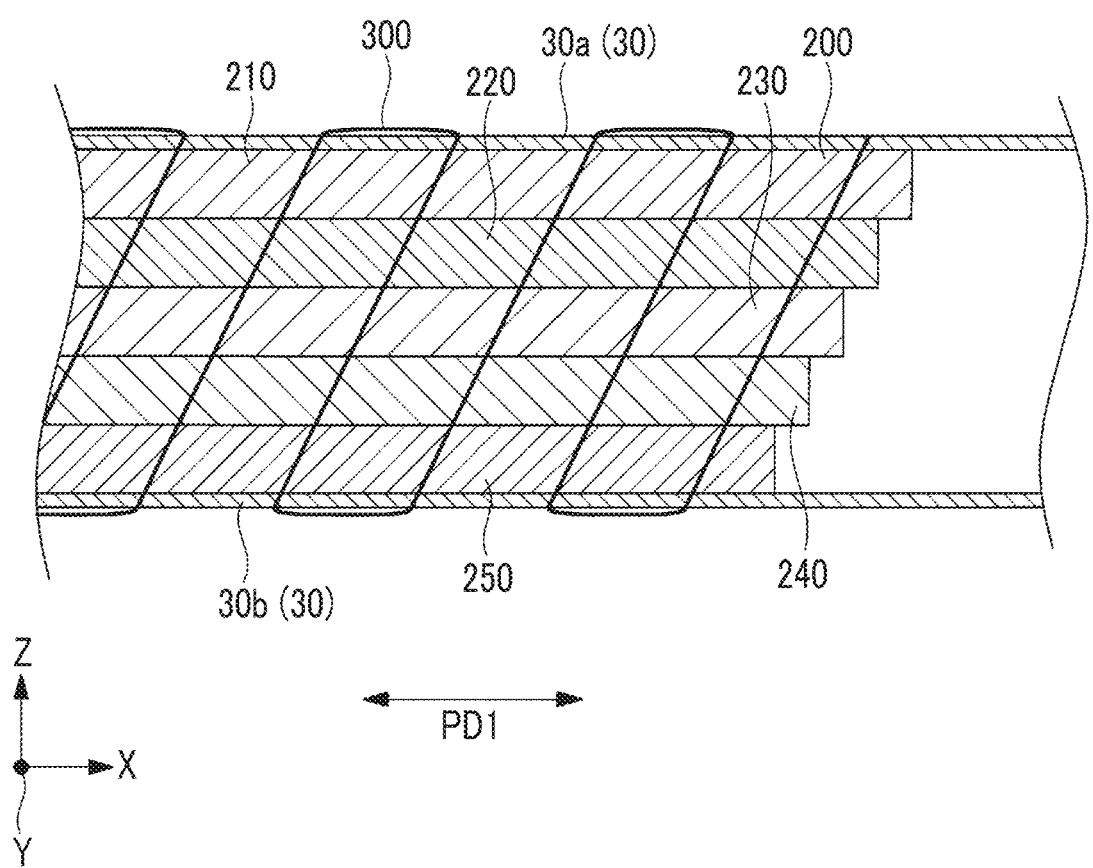
FIG. 11 is a cross-sectional view taken along line C-C which shows the laminate shown in FIG. 9 as seen along arrows and shows a state where there is an interlayer slip in the laminate.

FIG. 10 is a cross-sectional view taken along line C-C which shows the laminate 200 shown in FIG. 9 as seen along arrows and shows a state where there is no interlayer slip in the laminate 200. FIG. 11 is a cross-sectional view taken along line C-C which shows the laminate 200 shown in FIG. 9 as seen along arrows and shows a state where there is an interlayer slip in the laminate 200.

As shown in FIG. 10, the laminate 200 is obtained by laminating the reinforcing fiber sheet 210, the reinforcing fiber sheet 220, the reinforcing fiber sheet 230, the reinforcing fiber sheet 240, and the reinforcing fiber sheet 250. The first end portion 30a of the connection sheet 30 is disposed to come into contact with the upper surface of the reinforcing fiber sheet 210 and the second end portion of the connection sheet 30 is disposed to come into contact with the lower surface of the reinforcing fiber sheet 250. The reinforcing fiber sheets 210, 220, 230, 240, and 250 are sutured together with the first end portion 30a and the second end portion 30b of the connection sheet 30 by means of the suture material 300.

As shown in FIG. 11, in the case of the laminate 200 of the first modification example, the reinforcing fiber sheets are sutured together by means of the suture material 300 in the direction along the axis X. Therefore, it is possible to cause an interlayer slip between the reinforcing fiber sheets constituting respective layers of the laminate 200 along the axis X. By causing the interlayer slip, it is possible to form the laminate 200 along the surface shapes of the lower die 10 and the upper die 20 and to restrain the laminate 200 from being wrinkled.

Second Modification Example

In the case of the laminate 200 shown in FIGS. 10 and 11, the first end portion 30a of the connection sheet 30 is disposed on the upper surface of the laminate 200 and the second end portion 30b of the connection sheet 30 is disposed on the lower surface of the laminate 200. However, other configurations may also be adopted. For example, as shown in FIG. 12, the connection sheet 30 may be sandwiched between a pair of reinforcing fiber sheets that are disposed adjacent to each other.

Figure 12:
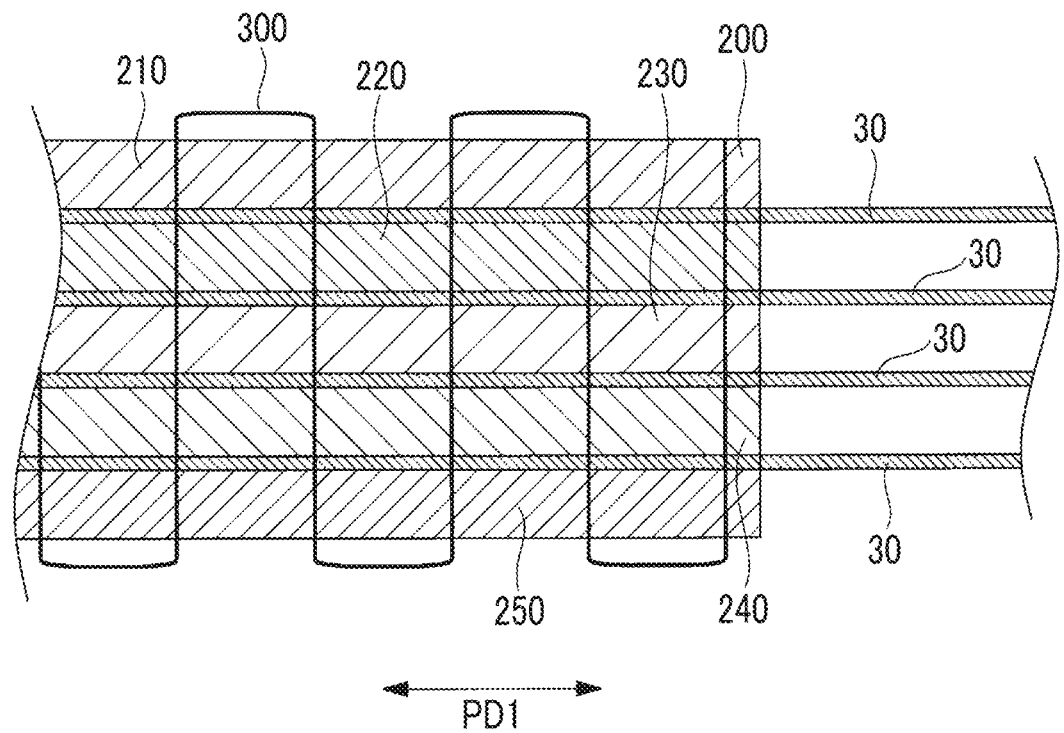
FIG. 12 is a cross-sectional view showing a second modification example of the laminate of the present disclosure.

FIG. 12 is a cross-sectional view showing a second modification example of the laminate 200 of the present disclosure. As shown in FIG. 12, in the case of the laminate 200 of the second modification example, the connection sheet is sandwiched between the reinforcing fiber sheet 210 and the reinforcing fiber sheet 220 and the connection sheet is sandwiched between the reinforcing fiber sheet 220 and the reinforcing fiber sheet 230. In addition, in the case of the laminate 200 of the second modification example, the connection sheet 30 is sandwiched between the reinforcing fiber sheet 230 and the reinforcing fiber sheet 240 and the connection sheet 30 is sandwiched between the reinforcing fiber sheet 240 and the reinforcing fiber sheet 250.

In addition, in the case of the laminate 200 of the second modification example, the reinforcing fiber sheets 210, 220, 230, 240, and 250 and a plurality of the connection sheets 30 sandwiched therebetween are sutured together by means of the suture material 300. In the second modification example, in the lay-up step of step S101 shown in FIG. 6, the plurality of reinforcing fiber sheets are laminated in a state where the connection sheet 30 is sandwiched between a pair of reinforcing fiber sheets disposed adjacent to each other. In addition, in the suturing step of step S102, the plurality of connection sheets 30 and the reinforcing fiber sheets 210, 220, 230, 240, and 250 are sutured together by means of the suture material 300.

Third Modification Example

In the case of the laminate 200 shown in FIGS. 10 and 11, the first end portion 30a of the connection sheet 30 is disposed on the upper surface of the laminate 200 and the second end portion 30b of the connection sheet 30 is disposed on the lower surface of the laminate 200. However, other configurations may also be adopted. For example, as shown in FIG. 13, connecting members 30A each of which is formed in a plate-like shape may be disposed instead of the connection sheet 30.

Figure 13:
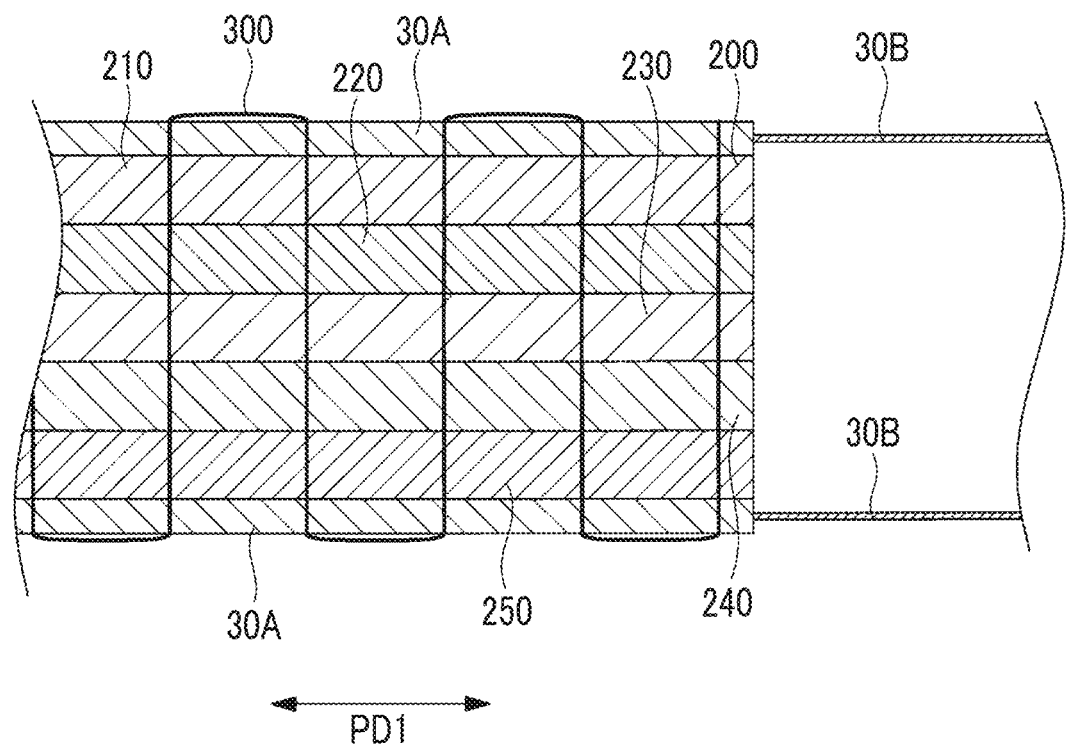
FIG. 13 is a cross-sectional view showing a third modification example of the laminate of the present disclosure.

FIG. 13 is a cross-sectional view showing a third modification example of the laminate 200 of the present disclosure. As shown in FIG. 13, the connecting member 30A is disposed to come into contact with the upper surface of the reinforcing fiber sheet 210 and the connecting member 30A is disposed to come into contact with the lower surface of the reinforcing fiber sheet 250. The reinforcing fiber sheets 210, 220, 230, 240, and 250 and the pair of connecting members 30A are sutured together by means of the suture material 300.

Since each connecting member 30A is formed in a plate-like shape, the tension of the suture material 300 is not locally applied to the reinforcing fiber sheet 210 and the reinforcing fiber sheet 250. The tension of the suture material 300 is transmitted to the reinforcing fiber sheet 210 and the reinforcing fiber sheet 250 via the connecting members 30A. Therefore, it is possible to appropriately prevent the reinforcing fiber sheet 210 and the reinforcing fiber sheet 250 from being deformed because of a tension locally applied thereto.

Wires 30B are connected to the connecting members 30A, and a tension along the first predetermined direction PD1 is applied via the wires 30B. A tension in a direction in which the first end portion region 200a is pulled away from the second end portion region 200b along the first predetermined direction PD1 is applied to the plurality of reinforcing fiber sheets of the laminate 200 via the connecting members 30A connected to the suture material 300. Therefore, the laminate 200 is prevented from being wrinkled in a case where the upper die 20 comes into contact with the upper surface of the laminate 200 and is moved downward.

Fourth Modification Example

In the case of the laminate 200 of the third modification example, a tension is applied to the connecting members 30A formed in a plate-like shape via the wires 30B. However, other configurations may also be adopted. For example, a configuration in which wires (connecting members) are connected to the suture material 300 as shown in FIG. 14 so that a tension is directly applied to the suture material 300 may also be adopted instead of a configuration in which the wires 30B are connected to the connecting members 30A.

Figure 14:
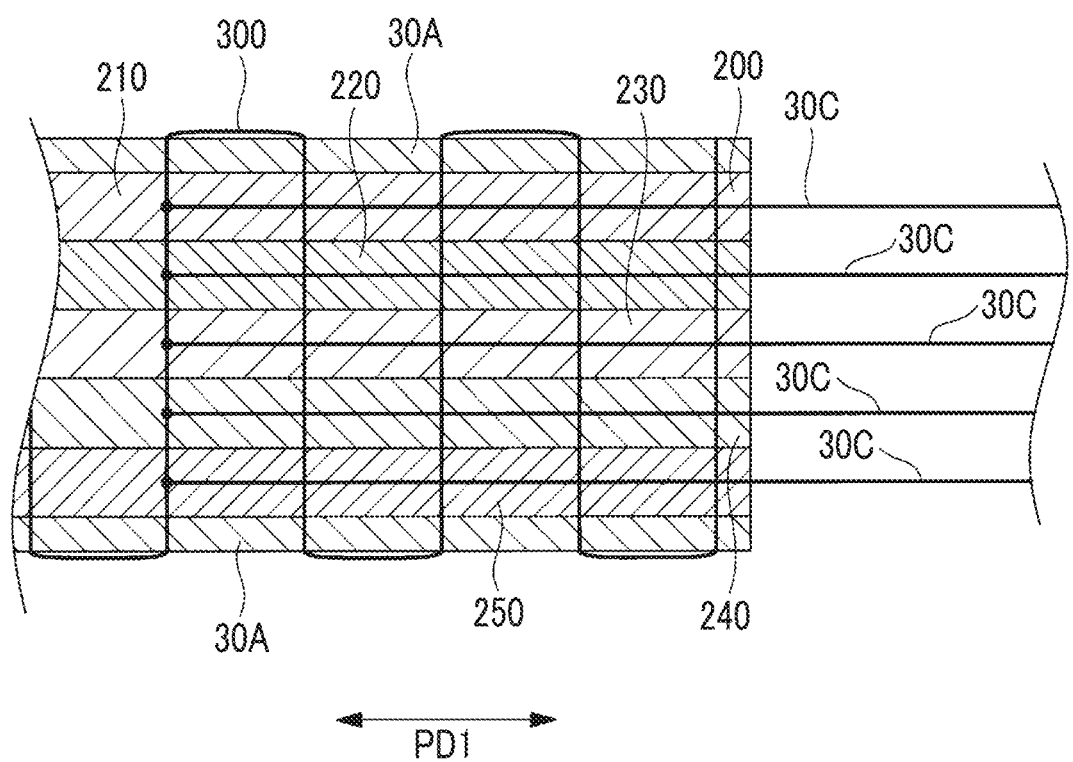
FIG. 14 is a cross-sectional view showing a fourth modification example of the laminate of the present disclosure.

FIG. 14 is a cross-sectional view showing a fourth modification example of the laminate 200 of the present disclosure. As shown in FIG. 14, the connecting member 30A is disposed to come into contact with the upper surface of the reinforcing fiber sheet 210 and the connecting member is disposed to come into contact with the lower surface of the reinforcing fiber sheet 250. The reinforcing fiber sheets 210, 220, 230, 240, and 250 and the pair of connecting members 30A are sutured together by means of the suture material 300.

In addition, each of the wires 30C formed in a linear shape is connected to the suture material 300. A tension along the first predetermined direction PD1 is applied to the suture material 300 via the wires 30C. A tension in a direction in which the first end portion region 200a is pulled away from the second end portion region 200b along the first predetermined direction PD1 is applied to the plurality of reinforcing fiber sheets of the laminate 200 via the suture material 300. Therefore, the laminate 200 is prevented from being wrinkled in a case where the upper die 20 comes into contact with the upper surface of the laminate 200 and is moved downward.

Fifth Modification Example

Figure 16:
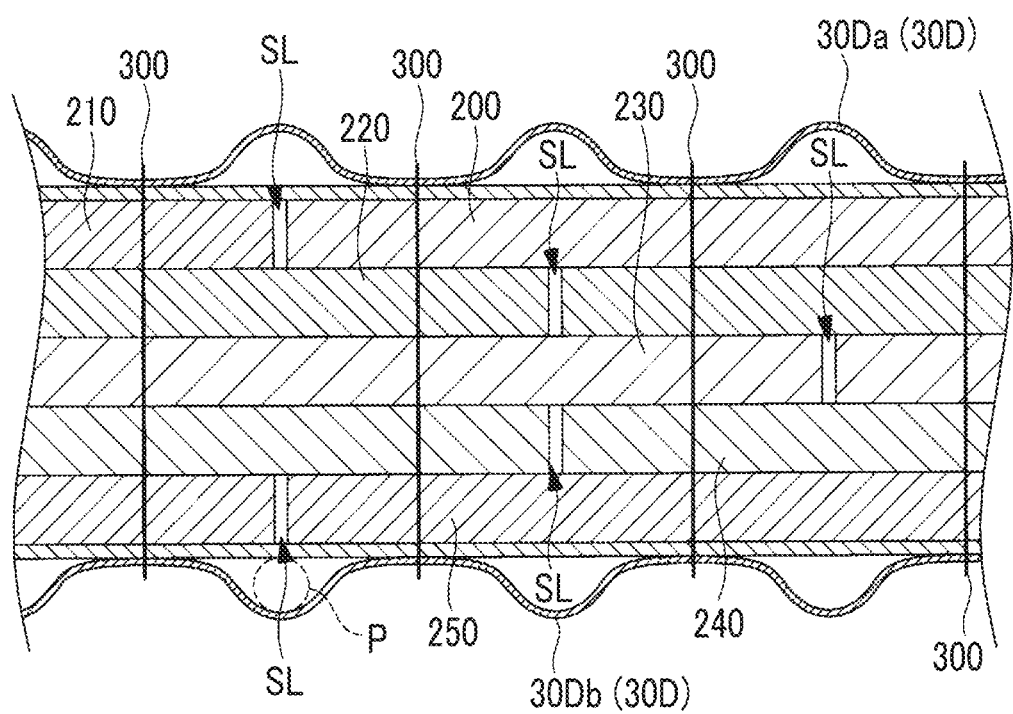
FIG. 16 is a cross-sectional view taken along line D-D which shows the laminate shown in FIG. 15 as seen along arrows.
Figure 16:
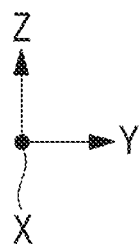

In the case of the laminate 200 of the first modification example, the entire first end portion 30a of the connection sheet 30 is brought into contact with the reinforcing fiber sheet 210, and the entire second end portion 30b of the connection sheet 30 is brought into contact with the reinforcing fiber sheet 250. However, other configurations may also be adopted. For example, as shown in FIG. 16, only a portion of a first end portion 30Da of a connection sheet 30D may be brought into contact with the reinforcing fiber sheet 210 and only a portion of a second end portion 30Db of the connection sheet 30D may be brought into contact with the reinforcing fiber sheet 250.

Figure 15:
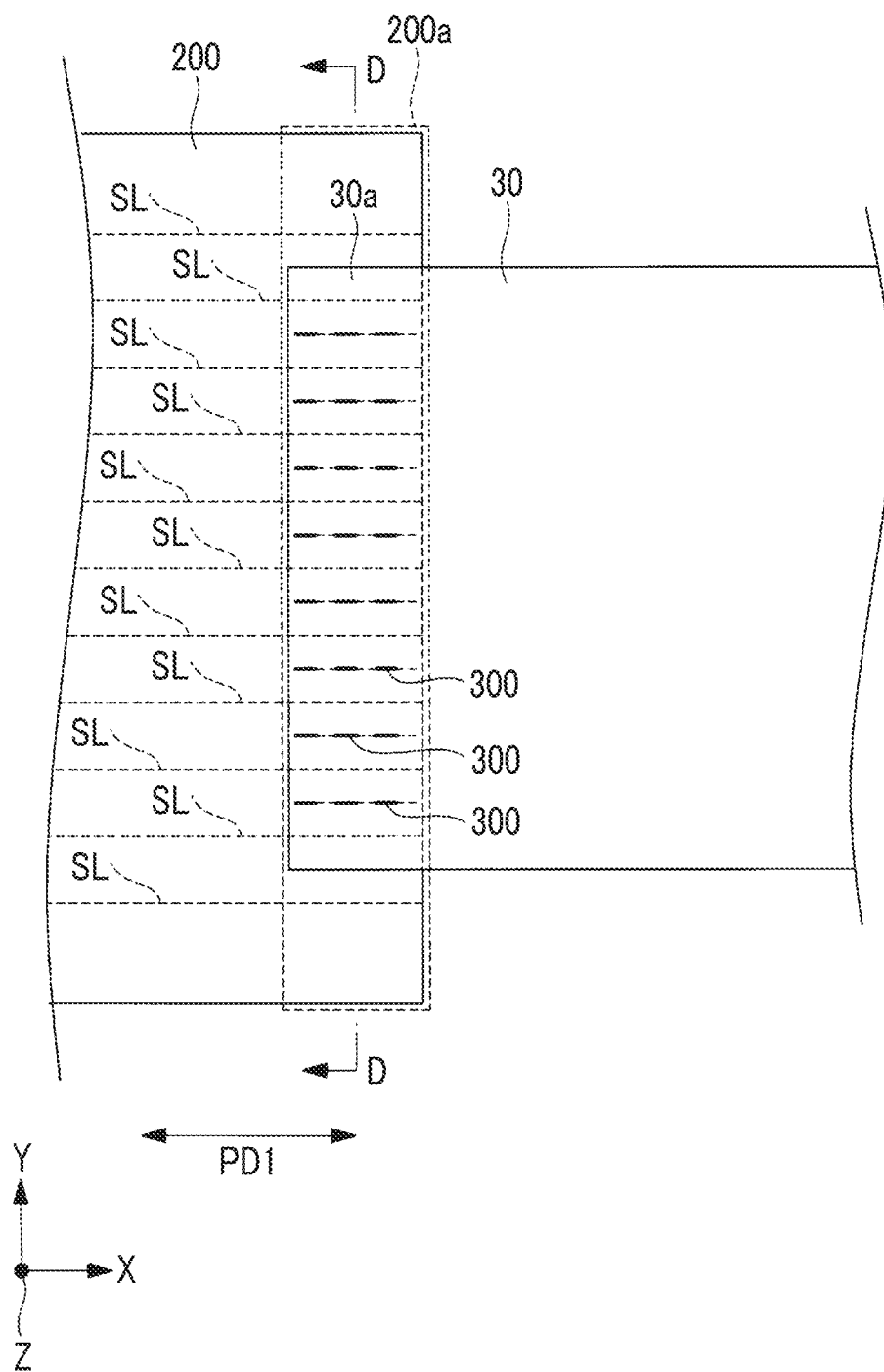
FIG. 15 is a plan view showing a fifth modification example of the laminate of the present disclosure.

FIG. 15 is a plan view showing a fifth modification example of the laminate 200 of the present disclosure. FIG. 16 is a cross-sectional view taken along line D-D which shows the laminate 200 shown in FIG. 15 as seen along arrows. Slits SL represented by broken lines in FIG. 15 show the positions of cuts that are formed in the reinforcing fiber sheets constituting the laminate 200 and that extend along the first predetermined direction PD1.

Although eleven slits SL are shown in FIG. 15, the eleven slits SL are not formed in one reinforcing fiber sheet, and the slits SL are formed at any (for example, three) of eleven positions. In addition, the number of positions where the slits SL are formed may be any number other than eleven.

The reason why the slits SL are formed in the reinforcing fiber sheets of the present modification example is to prevent the laminate 200 from being wrinkled in a case where the laminate 200 is formed by means of the lower die 10 that has a portion curved in a direction along the axis Y and the upper die 20.

As shown in FIG. 16, the first end portion 30Da of the connection sheet 30D of the present modification example is disposed in a wave-like shape such that the first end portion 30Da comes into contact with the reinforcing fiber sheet 210 in a direction along the axis Y at a position where the first end portion 30Da is sutured by means of the suture material 300 and the first end portion 30Da does not come into contact with the reinforcing fiber sheet 210 at other positions. Similarly, the second end portion 30Db of the connection sheet 30D of the present modification example is disposed in a wave-like shape such that the second end portion 30Db comes into contact with the reinforcing fiber sheet 250 in a direction along the axis Y at a position where the second end portion 30Db is sutured by means of the suture material 300 and the second end portion 30Db does not come into contact with the reinforcing fiber sheet 250 at other positions.

The reason why only a portion of the first end portion of the connection sheet 30D is brought into contact with the reinforcing fiber sheet 210 is to cause the connection sheet 30D to deform following an increase in widths of the slits SL in a case where the widths of the slits SL of the reinforcing fiber sheets are increased along the axis Y. Since the connection sheet 30D is disposed in a wave-like shape along the axis Y, the connection sheet does not hinder an increase in widths of the slits SL along the axis Y in the case of deformation of the reinforcing fiber sheets.

In a case where the connection sheet 30D is disposed in a wave-like shape along the axis Y, it is desirable to use a pipe P represented by a broken line in FIG. 16, for example. The pipe P is a cylindrical member disposed along the axis X so as to come into contact with a reinforcing fiber sheet. When the connection sheet 30D is sutured to the laminate 200 by means of the suture material 300 in a state where the pipe P is in contact with the reinforcing fiber sheet, the connection sheet 30D is disposed in a wave-like shape along the shape of the pipe P. After the connection sheet 30D is sutured to the laminate 200, the pipe P is extracted from the connection sheet 30D.

Note that, in the present modification example, only a portion of the first end portion 30Da of the connection sheet 30D is brought into contact with the reinforcing fiber sheet 210 and only a portion of the second end portion 30Db of the connection sheet 30D is brought into contact with the reinforcing fiber sheet 250. However, other configurations may also be adopted. For example, a flexible material that is deformable along the axis Y may be adopted as the connection sheet 30D, and the entire connection sheet 30D may be brought into contact with the reinforcing fiber sheet 210.

In the case of the laminate 200 of the present modification example, the slits SL extending along the first predetermined direction PD1 are formed in the reinforcing fiber sheets and the laminate 200 is sutured along the first predetermined direction PD1 by means of the suture material 300. The reason why the laminate 200 is sutured along the first predetermined direction PD1 by means of the suture material 300 is to prevent the suture material 300 from hindering expansion of the slits SL along the axis Y. In a case where the laminate 200 is sutured along axis Y by means of the suture material 300, expansion of the slits SL along the axis Y is hindered.

Sixth Modification Example

In the case of the laminate 200 of the fifth modification example, the laminate 200 is sutured along the first predetermined direction PD1 by means of the suture material 300 so that the suture material 300 is prevented from hindering expansion of the slits SL along the axis Y. However, other configurations may also be adopted. For example, the laminate 200 may be sutured in a zigzag direction along the axis Y by means of the suture material 300.

Figure 17:
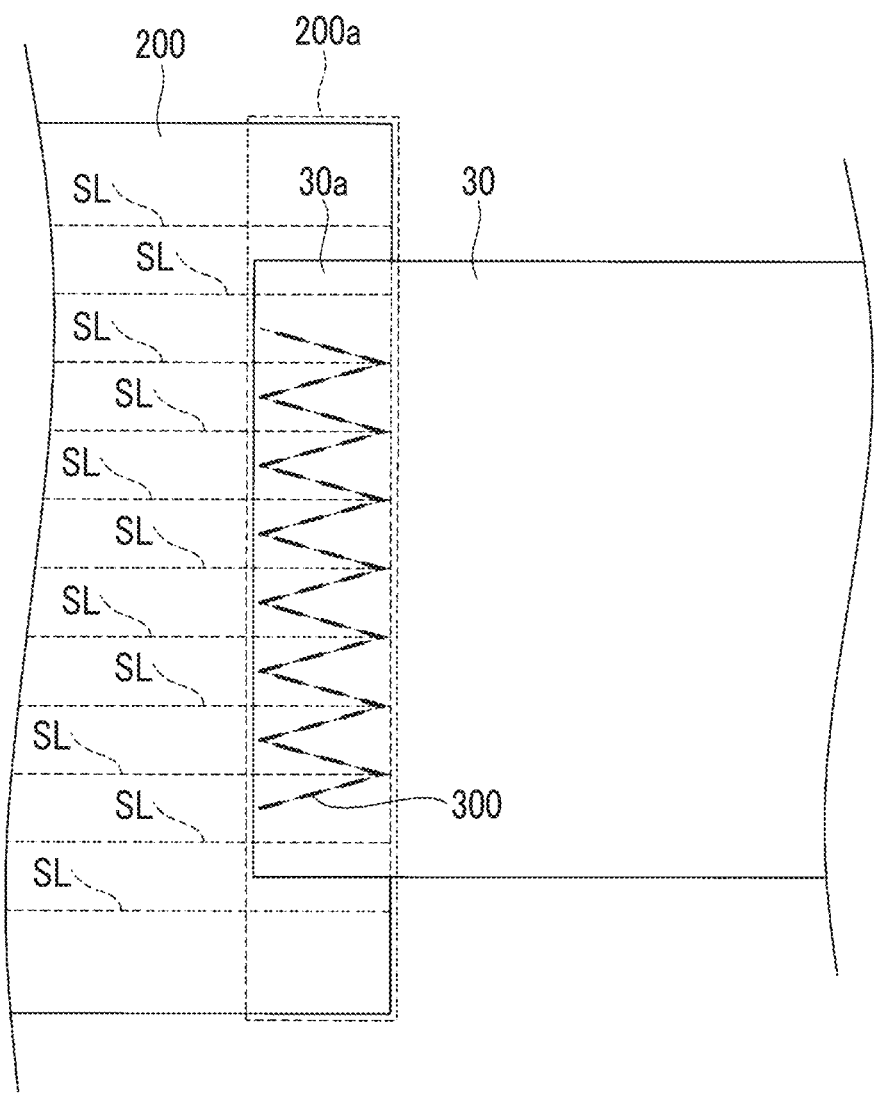
FIG. 17 is a plan view showing a sixth modification example of the laminate of the present disclosure.

FIG. 17 is a plan view showing a sixth modification example of the laminate 200 of the present disclosure. As shown in FIG. 17, the laminate 200 of the present modification example is sutured, by means of the suture material 300, in a pattern that zigzags in a direction along the axis X as the pattern advances along the axis Y so that the suture material 300 is prevented from hindering expansion of the slits SL along the axis Y.

The forming method described in the embodiment described above is understood as follows, for example.

A forming method according to the present disclosure is a forming method of forming a laminate (200) that is obtained by laminating a plurality of sheet materials including reinforcing fibers, the forming method including: a suturing step (S102) of suturing, by means of a suture material (300) that has a linear shape, a first end portion region (200a) in a first predetermined direction (PD1) of the plurality of sheet materials in a state where the plurality of sheet materials are laminated; a fixing step (S103) of fixing a second end portion region (200b) in the first predetermined direction of the laminate to a first forming die (10) in a state where the first predetermined direction coincides with a second predetermined direction (PD2), the first forming die including a curved portion (13) having at least one of a concave shape and a convex shape along the second predetermined direction; and a forming step (S104) of forming the laminate along a surface shape of the first forming die by pressing a second forming die (20) against the laminate fixed to the first forming die in the fixing step. In the forming step, the laminate is formed in a state where a tension in a direction in which the first end portion region is pulled away from the second end portion region along the first predetermined direction is applied to the plurality of sheet materials via a connecting member (30) connected to the suture material.

According to the forming method of the present disclosure, the second end portion region of the laminate of which the first end portion region in the first predetermined direction is sutured by means of the linear suture material is fixed to the first forming die including the curved portion having at least one of the concave shape and the convex shape along the second predetermined direction in a state where the first predetermined direction coincides with the second predetermined direction. The laminate is formed along the surface shape of the first forming die with the second forming die pressed against the laminate.

According to the forming method of the present disclosure, the first end portion region in the first predetermined direction of the plurality of sheet materials is sutured by means of the linear suture material and the connecting member is connected to the suture material. The connecting member applies, to the plurality of sheet materials, the tension in the direction in which the first end portion region is pulled away from the second end portion region when forming is performed by means of the first forming die and the second forming die. Therefore, it is possible to maintain a state where a desired tension is applied to a plurality of sheet materials and to form a laminate such that the laminate is prevented from being wrinkled when forming a laminate obtained by laminating a plurality of sheet materials including reinforcing fibers.

The forming method of the present disclosure preferably includes a cutting step (S107) of cutting the first end portion region of the laminate.

According to the forming method of the present configuration, the first end portion region of the laminate is cut and thus it is possible to appropriately remove an unnecessary portion from a final product.

In the forming method of the present disclosure, the connecting member is preferably a member formed in a sheet-like shape or a plate-like shape, and in the suturing step, the connecting member disposed on a front surface and a back surface of the laminate is preferably sutured together with the plurality of sheet materials.

According to the forming method of the present configuration, the connecting member that is formed in a sheet-like shape or a plate-like shape and that is disposed on the front surface and the back surface of the laminate is sutured together with the plurality of sheet materials. Therefore, it is possible to apply a desired tension to the plurality of sheet materials sutured by means of the suture material connected to the connecting member by applying a tension to the connecting member formed in the sheet-like shape or the plate-like shape.

In the forming method of the present disclosure, the connecting member is preferably a member formed in a linear shape.

According to the forming method of the present configuration, since the connecting member formed in the linear shape is connected to the suture material, it is possible to apply a desired tension to the plurality of sheet materials sutured by means of the suture material connected to the connecting member by applying a tension to the connecting member formed in the linear shape.

The forming method of the present disclosure preferably further includes a lay-up step (S101) of laminating the plurality of sheet materials in a state where the connecting member formed in a sheet-like shape is sandwiched between a pair of the sheet materials disposed adjacent to each other and in the suturing step, the connecting member is preferably sutured together with the plurality of sheet materials.

According to the forming method of the present configuration, the connecting member formed in the sheet-like shape is sandwiched between the pair of sheet materials disposed adjacent to each other and the connecting member is sutured together with the plurality of sheet materials. Since a tension is applied to the sheet-shaped connecting member sandwiched between the pair of sheet materials, an appropriate tension can be applied to each of the pair of sheet materials with the connecting member sandwiched therebetween.

The forming device described in the embodiment described above is understood as follows, for example.

A forming device according to the present disclosure is a forming device forming a laminate that is obtained by laminating a plurality of sheet materials including reinforcing fiber. A first end portion region in a first predetermined direction of the plurality of sheet materials of the laminate is sutured by means of a suture material that has a linear shape in a state where the plurality of sheet materials are laminated, and the forming device includes a first forming die that includes a curved portion having at least one of a concave shape and a convex shape along a second predetermined direction and to which a second end portion region in the first predetermined direction of the laminate is fixed in a state where the first predetermined direction coincides with the second predetermined direction, a second forming die that forms the laminate along a surface shape of the first forming die by pressing the laminate fixed to the first forming die against the first forming die, a connecting member that is connected to the suture material, and a tension generating mechanism that applies a tension in a direction in which the first end portion region is pulled away from the second end portion region along the first predetermined direction to the plurality of sheet materials via the connecting member.

According to the forming device of the present disclosure, the second end portion region of the laminate of which the first end portion region in the first predetermined direction is sutured by means of the linear suture material is fixed to the first forming die including the curved portion having at least one of the concave shape and the convex shape along the second predetermined direction in a state where the first predetermined direction coincides with the second predetermined direction. The laminate is formed along the surface shape of the first forming die with the second forming die pressed against the laminate.

According to the forming device of the present disclosure, the first end portion region in the first predetermined direction of the plurality of sheet materials is sutured by means of the linear suture material and the connecting member is connected to the suture material. The connecting member applies, to the plurality of sheet materials, the tension in the direction in which the first end portion region is pulled away from the second end portion region when forming is performed by means of the first forming die and the second forming die. Therefore, it is possible to maintain a state where a desired tension is applied to a plurality of sheet materials and to form a laminate such that the laminate is prevented from being wrinkled when forming a laminate obtained by laminating a plurality of sheet materials including reinforcing fibers.

The forming device of the present disclosure preferably includes a cutting mechanism that cuts the first end portion region of the laminate.

According to the forming device of the present configuration, the first end portion region of the laminate is cut and thus it is possible to appropriately remove an unnecessary portion from a final product.

In the forming device of the present disclosure, the connecting member is preferably formed in a sheet-like shape or a plate-like shape, is preferably disposed on a front surface and a back surface of the laminate, and is preferably sutured together with the plurality of sheet materials by means of the suture material.

According to the forming device of the present configuration, the connecting member that is formed in a sheet-like shape or a plate-like shape and that is disposed on the front surface and the back surface of the laminate is sutured together with the plurality of sheet materials. Therefore, it is possible to apply a desired tension to the plurality of sheet materials sutured by means of the suture material connected to the connecting member by applying a tension to the connecting member formed in the sheet-like shape or the plate-like shape.

In the forming device of the present disclosure, the connecting member is preferably formed in a linear shape and is preferably connected to the suture material.

According to the forming device of the present configuration, since the connecting member formed in the linear shape is connected to the suture material, it is possible to apply a desired tension to the plurality of sheet materials sutured by means of the suture material connected to the connecting member by applying a tension to the connecting member formed in the linear shape.

In the forming device of the present disclosure, the connecting member is preferably formed in a sheet-like shape, is preferably sandwiched between a pair of the sheet materials disposed adjacent to each other, and is preferably sutured together with the plurality of sheet materials by means of the suture material.

According to the forming device of the present configuration, the connecting member formed in the sheet-like shape is sandwiched between the pair of sheet materials disposed adjacent to each other and the connecting member is sutured together with the plurality of sheet materials. Since a tension is applied to the sheet-shaped connecting member sandwiched between the pair of sheet materials, an appropriate tension can be applied to each of the pair of sheet materials with the connecting member sandwiched therebetween.

REFERENCE SIGNS LIST

10: Lower die
11: Upper surface
12: Side surface
13: Convex surface
14: Concave surface
15: Bottom surface
16: Fixation member
20: Upper die
21: Lower surface
22: Side surface
23: Convex surface
30D: Connection sheet (connecting member)
30A: Connecting member
30B: Wire
30C: Wire
30a, 30Da: First end portion
30b, 30Db: Second end portion
30c: Intermediate portion 40: Tension generating mechanism
41: Rod-shaped member
42: Wire
43: Supporting shaft
44: Weight
50: Urging force generating mechanism
51: Main body portion
52: Expansion and contraction member
100: Forming device
200: Laminate
200a: First end portion region
200b: Second end portion region
210, 220, 230, 240, 250: Reinforcing fiber sheet
300: Suture material
LD: Longitudinal direction
PD1: First predetermined direction
PD2: Second predetermined direction
SL: Slit

The invention claimed is:

1. A forming method of forming a laminate that is obtained by laminating a plurality of sheet materials including reinforcing fibers, the forming method comprising:
    a suturing step of suturing, by means of a suture material that has a linear shape, a first end portion region in a first predetermined direction of the plurality of sheet materials in a state where the plurality of sheet materials are laminated;
    a fixing step of fixing a second end portion region in the first predetermined direction of the laminate to a first forming die in a state where the first predetermined direction coincides with a second predetermined direction, the first forming die including a curved portion having at least one of a concave shape and a convex shape along the second predetermined direction; and
    a forming step of forming the laminate along a surface shape of the first forming die by pressing a second forming die against the laminate fixed to the first forming die in the fixing step,
    wherein, in the forming step, the laminate is formed in a state where a tension in a direction in which the first end portion region is pulled away from the second end portion region along the first predetermined direction is applied to the plurality of sheet materials via a connecting member connected to the suture material.

2. The forming method according to claim 1, further comprising:
    a cutting step of cutting the first end portion region of the laminate.

3. The forming method according to claim 1,
    wherein the connecting member is a member formed in a sheet-like shape or a plate-like shape, and
    in the suturing step, the connecting member disposed on a front surface and a back surface of the laminate is sutured together with the plurality of sheet materials.

4. The forming method according to claim 1,
    wherein the connecting member is a member formed in a linear shape.

5. The forming method according to claim 1, further comprising:
    a lay-up step of laminating the plurality of sheet materials in a state where the connecting member formed in a sheet-like shape is sandwiched between a pair of the sheet materials disposed adjacent to each other,
    wherein, in the suturing step, the connecting member is sutured together with the plurality of sheet materials.

6. A forming device forming a laminate that is obtained by laminating a plurality of sheet materials including reinforcing fibers, the laminate having a first end portion region in a first predetermined direction of the plurality of sheet materials of the laminate sutured by means of a suture material that has a linear shape in a state where the plurality of sheet materials are laminated, the forming device comprising:
    a first forming die that includes a curved portion having at least one of a concave shape and a convex shape along a second predetermined direction and to which a second end portion region in the first predetermined direction of the laminate is fixed in a state where the first predetermined direction coincides with the second predetermined direction;
    a second forming die that forms the laminate along a surface shape of the first forming die by pressing the laminate fixed to the first forming die against the first forming die;
    a connecting member that is connected to the suture material; and
    a tension generating mechanism that applies a tension in a direction in which the first end portion region is pulled away from the second end portion region along the first predetermined direction to the plurality of sheet materials via the connecting member.

7. The forming device according to claim 6, further comprising:
    a cutting mechanism that cuts the first end portion region of the laminate.

8. The forming device according to claim 6,
    wherein the connecting member is formed in a sheet-like shape or a plate-like shape, is disposed on a front surface and a back surface of the laminate, and is sutured together with the plurality of sheet materials by means of the suture material.

9. The forming device according to claim 6,
    wherein the connecting member is formed in a linear shape and is connected to the suture material.

10. The forming device according to claim 6,
    wherein the connecting member is formed in a sheet-like shape, is sandwiched between a pair of the sheet materials disposed adjacent to each other, and is sutured together with the plurality of sheet materials by means of the suture material.

* * * * *